United States Patent
Schmaranzer et al.

(10) Patent No.: US 7,422,241 B2
(45) Date of Patent: Sep. 9, 2008

(54) SUPPORT FOR A VEHICLE BODY

(75) Inventors: Christian Schmaranzer, Alkoven (AT); Alois Leitner, Weyregg am Attersee (AT)

(73) Assignee: voestalpine STAHL GmbH, Linz (AT)

( * ) Notice: Subject to any disclaimer, the term of this patent is extended or adjusted under 35 U.S.C. 154(b) by 165 days.

(21) Appl. No.: 10/557,955

(22) PCT Filed: Jun. 22, 2004

(86) PCT No.: PCT/AT2004/000213

§ 371 (c)(1),
(2), (4) Date: Nov. 22, 2005

(87) PCT Pub. No.: WO2004/113151

PCT Pub. Date: Dec. 29, 2004

(65) Prior Publication Data

US 2006/0214412 A1 Sep. 28, 2006

(30) Foreign Application Priority Data

Jun. 24, 2003 (AT) .............................. A 972/2003

(51) Int. Cl.
*B62D 21/00* (2006.01)

(52) U.S. Cl. .................. 280/781; 280/798; 148/523; 148/527; 148/529; 148/531

(58) Field of Classification Search .............. 280/781, 280/784, 798, 796; 148/527, 523, 528, 529, 148/531, 540

See application file for complete search history.

(56) References Cited

U.S. PATENT DOCUMENTS

| 3,202,793 | A |  | 8/1965 | Bertels |  |
|---|---|---|---|---|---|
| 3,341,680 | A |  | 9/1967 | Rjabov et al. |  |
| 6,316,125 | B1 | * | 11/2001 | Gaman et al. | 428/654 |
| 7,175,204 | B2 | * | 2/2007 | Tarbutton et al. | 280/785 |
| 7,232,002 | B2 | * | 6/2007 | Taya et al. | 180/274 |
| 2002/0079722 | A1 |  | 6/2002 | Mayrhofer et al. |  |
| 2002/0163173 | A1 | * | 11/2002 | Ruehl et al. | 280/781 |
| 2005/0257861 | A1 | * | 11/2005 | Raos | 148/592 |

FOREIGN PATENT DOCUMENTS

| DE | 100 61 848 | 6/2002 |
|---|---|---|
| JP | 58 100 978 | 6/1983 |

* cited by examiner

*Primary Examiner*—Toan C To
(74) *Attorney, Agent, or Firm*—Collard & Roe, P.C.

(57) ABSTRACT

A girder is described for a vehicle chassis made of at least two sheet metal profiles (4, 5) composed along their longitudinal edges into a circumferentially enclosed hollow profile (1), which hollow profile comprises at least two longitudinal sections (2, 3) which are both materially joined by way of a joining seam (10). In order to provide advantageous constructional conditions it is proposed that one of the two longitudinal sections (2, 3) consists of an iron material and the other longitudinal section (2) of the hollow profile (1) consists of an aluminum material, and that the joining seam (10) forming a welded/soldered connection between the butt-jointed longitudinal sections (2, 3) of the hollow profile (1) comprises an additional material (12) on the basis of aluminum as solder which is applied into a coating of the iron material in a width (b) corresponding to at least three times the thickness (d) of said iron material

4 Claims, 3 Drawing Sheets

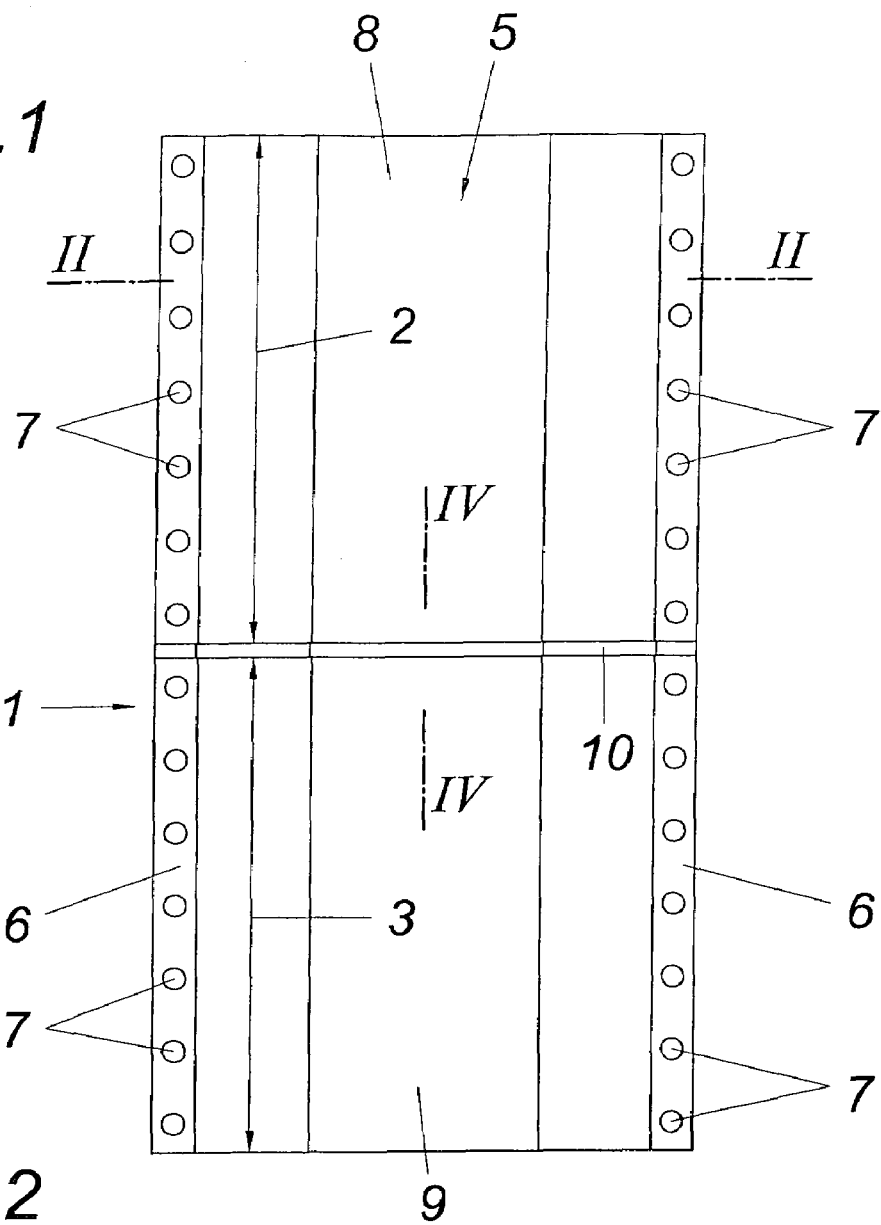
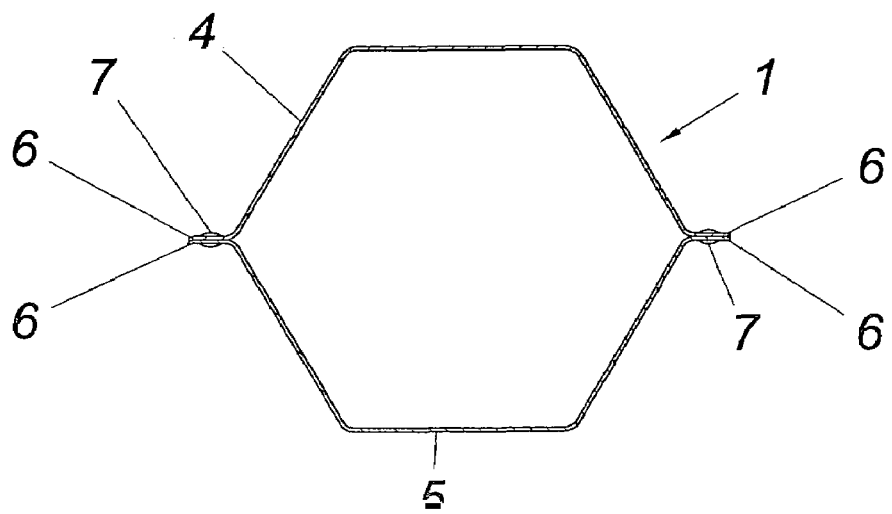

SUPPORT FOR A VEHICLE BODY

CROSS REFERENCE TO RELATED APPLICATIONS

Applicants claim priority under 35 U.S.C. §119 of Austrian Application No. A972/2003 filed on Jun. 24, 2003. Applicants also claim priority under 35 U.S.C. §365 of PCT/AT2004/000213 filed on Jun. 22, 2004. The international application under PCT article 21(2) was not published in English.

FIELD OF THE INVENTION

The invention relates to a girder for a vehicle chassis made of at least two sheet metal profiles composed along their longitudinal edges into a circumferentially enclosed hollow profile, which hollow profile comprises at least two longitudinal sections which are both materially joined by way of a joining seam.

DESCRIPTION OF THE PRIOR ART

For adjusting vehicle girders to different chassis lengths it is known (DE 100 61 848 A1) to use hollow profiles which are composed of two longitudinal sections. These sections are inserted into each other for joining and welded together in the overlapping region. In order to absorb the impact energy, the hollow profile can be provided with predetermined bending points. The leap in the strength caused by the overlapping of the longitudinal sections leads to difficulties, even if there are efforts to ameliorate this leap in strength by a joining plane extending in an inclined fashion relative to the longitudinal axis of the girder. Moreover, not only is there a considerable portion of weight in the vehicle chassis caused by such girders made of iron material, but also the distribution of weight over the girder length in connection with the same has proven to be unfavorable in numerous cases. For this reason, a girder made of an iron material on the one hand and of an aluminum material on the other hand could better meet the requirements placed on weight and stress. Sheet metal profiles made of an iron material cannot be easily joined with sheet metal profiles made of an aluminum material.

When an aluminum material is thermally joined with an iron material, the aluminum material is molten in the joining region, so that the molten aluminum wets the iron material and a materially joined connection is obtained after the iron material and a materially joined connection is obtained after the cooling. In the transitional region between the materials, brittle intermetallic phases are formed however which relevantly co-determine the loading capacity of the joint. In order to substantially prevent the occurrence of brittle intermetallic phases in the region of a joining seam it is already known (U.S. Pat. No. 3,202,793 A) to provide the iron material at least in the joining region with a coating on the basis of zinc before an additional material on the basis of aluminum is applied in a melt-metallurgical manner on both sides of the sheet metal between the abutting sheet metal parts for the purpose of forming a joining seam. Said additional material enters into a welded joint with the aluminum material and is used as a solder for the connection with the iron material. The additional material does not come into molten contact with the iron material, but exclusively with the coating material, so that intermetallic phases can be suppressed to a substantial extent as a result of the chosen additional material on the basis of aluminum. The strength of these braze welded joints is insufficient, even if the iron sheet is provided with breakthroughs in the joining region for improving the strength in order to obtain an improved bonding of the additional material with the iron sheet by the additional material passing through said breakthroughs.

SUMMARY OF THE INVENTION

The invention is thus based on the object of providing a girder for a vehicle chassis of the kind mentioned above in such a way that aluminum materials on the one hand and iron materials on the other hand can be used according to their material properties in order to advantageously meet both the strength and weight requirements.

This object is achieved by the invention in such a way that one of the two longitudinal sections consists of an iron material and the other longitudinal section of the hollow profile consists of an aluminum material, and that the joining seam forming a welded/soldered connection comprises between the butt-jointed longitudinal sections of the hollow profile an additional material on the basis of aluminum as solder which is applied on a coating of the iron material in a width corresponding to at least three times the thickness of said iron material.

The subdivision of the hollow profile of the girder into two longitudinal sections of an iron material on the one hand and of an aluminum material on the other hand offers the advantage that the longitudinal section of the girder associated with the passenger compartment can consist of a more deflection-resistant iron material, whereas the longitudinal section made of aluminum material which is farther away from the passenger compartment is suitable as a result of its lower flexural strength to absorb any occurring impact energies and to convert the same into deformation work, such that the longitudinal section of the girder made of aluminum material is bulged in a fold-forming way with a shortening of its length. This will only occur when the forces occurring during an impact load can also be transmitted via the joining seam between the two longitudinal sections of different materials. For this purpose, the additional material on the basis of aluminum for forming the solder for the iron material is applied on both sides at a width which corresponds to at least three times the thickness of the sheet metal profile made of iron. This condition ensures that normal tensions in the region of the soldering zone which are critical for the loading capacity of the joining seam will remain in a permissible range between the additional material on the basis of aluminum and the iron material even in a plastic deformation of the joined sheet metal blanks because the joining geometry is configured appropriately. As a result, strength values can at least be observed in the seam region which are also present in the adjacent sheet metal regions. As a result of the known coating of the iron material preferably with a zinc or aluminum material, the electrochemical potential difference between the coating of the iron material and the additional material is clearly reduced in comparison with the potential difference between the iron material and the additional material on the basis of aluminum, thus decisively reducing the inclination for contact corrosion. Moreover, the inclination towards the formation of brittle, intermetallic phases is reduced by the coating of the iron material in the joining region, which is also relevant for the strength of the welded/soldered joint.

An additional factor is that a clear reduction of the weight is linked to the formation of a longitudinal section of the girder made of an aluminum material. The reduction in the weight of the hollow profile limited to a longitudinal section of the girder can also be used for improving the performance of a motor vehicle. If the distribution of weight over the vehicle length is displaced to the disadvantage of driving performance in the case of a weight relief of the rear of a front-wheel driven motor vehicle, an advantageous distribution of weight can be secured again by the formation of a girder with a longitudinal section made of aluminum projecting beyond the driven front axle without having to increase the rear weight.

In order to achieve a gradual take-up of the load between the different materials of the longitudinal sections of the girder by avoiding excessive tension peaks, the longitudinal section made of the iron material can be provided in the abutting region with a bevel at least on the one side, so that the carrying cross section of the iron material continuously decreases towards the aluminum material, whereas the carrying cross section of the aluminum material increases accordingly. Said bevel needs to be coated with a coating like the remaining joining region in order to ensure the material bonding between the iron material and the additional material on the basis of aluminum.

For producing a girder in accordance with the invention for a vehicle chassis, the sheet metal profiles to be joined into a hollow profile can consist of two blanks each which correspond to the two longitudinal sections of the hollow profile and consist of iron material on the one hand and of aluminum material on the other hand. When the plane blanks of these sections of iron material and aluminum material are joined with one another by a welded/soldered joint in form of a butt-joint by using an additional material on the basis of aluminum which is applied for the formation of the joining seam to both sides of the blank made of the iron material under melting on a coating of the iron material at a width corresponding to at least three times the thickness of said blank, the forces caused by plastic deformation can be transmitted via the joining seam between the blanks without having to fear any overloading of the joining seam. As a result of this seam formation, the joined plane blanks of each sheet metal profile can jointly be subjected to cold forming, which considerably reduces the production expenses because cold-formed sheet metal profiles merely need to be joined with each other along their longitudinal edges into the hollow profile of the girder. This can be performed by material joining or interlocking the adjacent longitudinal edge flanges, i.e. with the help of joining techniques which are independent of the respective material of the longitudinal sections of the hollow profile.

Although the joining seam of additional material bridging the butt region between the blanks of the sheet metal profiles leads to ridges in the butt region, these ridges by the joining seam on both sides do not play any decisive role for the later deformation of the butt-jointed blanks because ridges can be taken into account by respective recesses in the form tool. For the purpose of reducing ridges, the joining seam formed by the additional material between the blanks of the sheet metal profile sections can be flattened prior to the joint cold forming of the joined blanks.

BRIEF DESCRIPTION OF THE DRAWINGS

The subject matter of the invention is shown in the drawings by way of example, wherein:

FIG. 1 shows a schematic side view of a girder in accordance with the invention for a vehicle chassis in sections in the region of the butt-joint between the two longitudinal sections;

FIG. 2 shows said girder in a cross-sectional view along line II-II of FIG. 1;

DESCRIPTION OF THE PREFERRED EMBODIMENT

Figure 3:
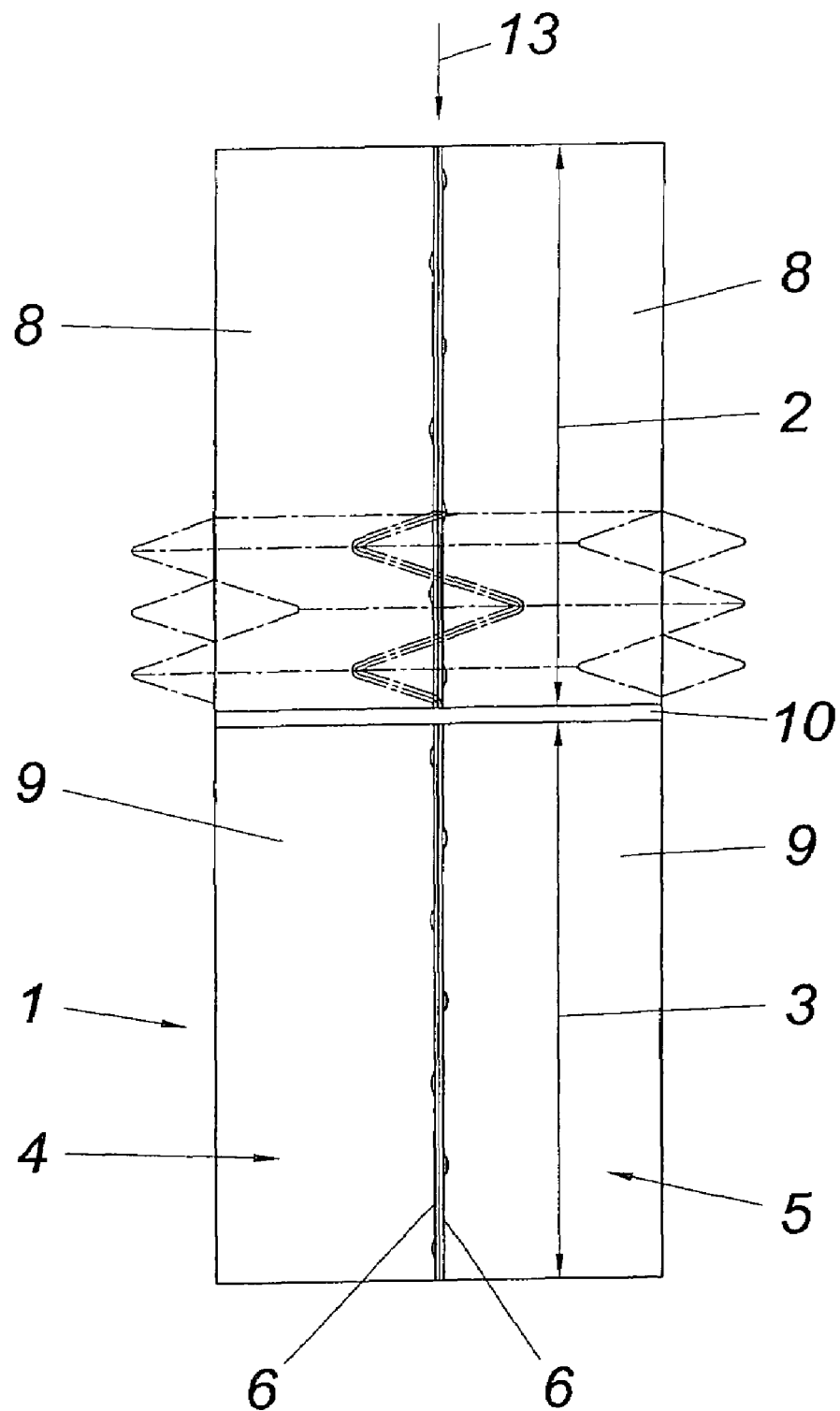
FIG. 3 shows a side of the girder which is rotated by 90° relative to FIG. 1.

The carrier shown schematically in FIGS. 1 to 3 is formed by a hollow profile 1 which is shown schematically with a hexagonal cross section. Said hollow profile 1 comprises two longitudinal sections 2 and 3 made of different materials. The longitudinal section 2 consists of aluminum and the longitudinal section 3 of iron.

Hollow profile 1 is not only subdivided in its length into the two sections 2 and 2, but also composed of two sheet metal profiles 4 and 5 which are mutually joined via longitudinal edge flanges 6, namely by means of punch rivets 7. Punch rivets 7 are advantageous but not mandatory for the flanged joint. It could also be arranged as a glued connection.

Figure 4:
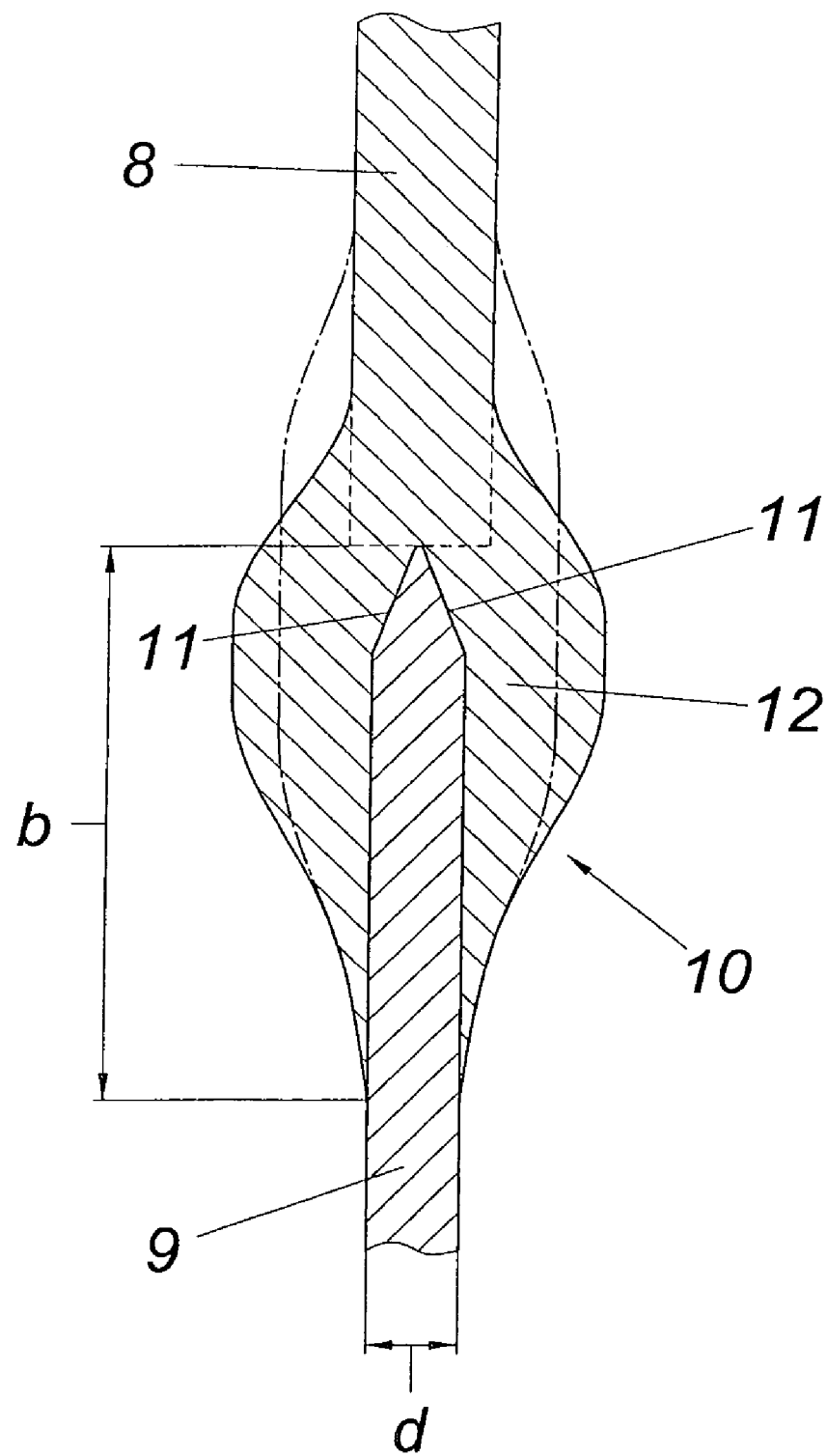
FIG. 4 shows a sectional view through the joining seam along line IV-IV of FIG. 1 on an enlarged scale.

The sheet metal profiles 4 and 5 are joined from two blanks 8 and 9 each which correspond to the longitudinal sections 2 and 3 of the hollow profile 1 and consequently consist of an aluminum material and an iron material. These butt-jointed blanks 8 and 9 are mutually materially joined by a joining seam 10. The blank 9 made of iron according to FIG. 4 is provided for this purpose with bevels 11 on both sides in the region of the edge forming the butt-joint. The bevels 11 are provided like the other surfaces of the joining region of the iron material with a coating preferably on the basis of zinc. After moving together the blanks 8 and 9 to be joined, an additional material 12 on the basis of aluminum is applied in the butt region on both sides of the blanks 8 and 9 and molten with the help of an arc, thus leading to a melt-metallurgical welded joint between the aluminum material of the blank 8 and the additional material 12 on the basis of aluminum forming the joining seam 10. This welded joint obtained by melting the aluminum material is indicated by a uniform hatching of blank 8 and the additional material 12, with the original edge of the blank 8 being shown with the broken line. The molten additional material 12 represents a solder for the bonding with the blank 9 made of the iron material, which solder is applied not only in the direct butt-joint region of the two blanks 8 and 9 but also bridges the butt-joint and overlaps the edge of the blank 9 made of the iron material on both sides. The additional material 12 forming the solder is applied in a coverage region which has a width b corresponding to at least three times the thickness d. The thus linked increase in the bonding length leads on the one hand to a reduction of the tension level in the region of the soldering zone to a permissible level, which tension level is co-relevant for the loading capacity of the joining seam. On the other hand, losses in strength caused by corrosion of the joint are kept below the corrosion-induced losses in strength of the weaker basic material of the joined blanks 8, 9 as a result of respectively long corrosion paths, so that in the case of a suitable treatment the joining region shows strength values over the entire service life of the girder which correspond at least to the strength values of the weaker of the two blanks 8, 9.

Since the blanks 8, 9 are joined in the plane state prior to cold forming, the sheet metal profiles 4, 5 can be formed from the joined plane sheet metal blanks 8, 9 by bending or deep-drawing in their entirety. The forces required for the plastic deformation of the blanks 8, 9 are transmitted via the joining seam 10 for this cold forming. The ridge formed by the joining seam 10 can be taken into account by a respective formation of the tools in plastic forming of the joined blanks

8, 9 which are plane at first, which tools may comprise recesses in the region of the joining seam 10 for example. The ridge can also be flattened by plastic deformation for example, as is indicated in FIG. 4 with the dot-dash line.

After the joining of the two sheet metal profiles 4, 5 by way of their longitudinal edge flanges 6 it is possible to load the girder. An impact load in the direction of arrow 13 will lead to a buckling of the hollow profile 1 in the region of the longitudinal section 2 made of the aluminum profile. The thus entailing formation of folds causing a shortening of the girder is indicated in FIG. 3 with the dot-dash line. As a result of the different buckling strengths of the longitudinal sections 2 and 3 of the hollow profile 1, it is ensured in a respective configuration of these sections that the applied impact energy is absorbed via the deformation work in the region of the longitudinal section 2 made of aluminum material, whereas the longitudinal section 3 made of iron material remains substantially non-deformed. The occurring forces can be transmitted via the joining seam 10 between the longitudinal sections 2 and 3 without exceeding the permissible loading of joining seam 10.

The invention claimed is:

1. A girder for a vehicle chassis made of at least two sheet metal profiles composed along their longitudinal edges into a circumferentially enclosed hollow profile, which hollow profile comprises at least two longitudinal sections which are both materially joined by way of a joining seam, wherein one of the two longitudinal sections consists of an iron material and the other longitudinal section of the hollow profile consists of an aluminum material, and that the joining seam forming a welded/soldered connection between the longitudinal sections of the hollow profile comprises an additional material on the basis of aluminum as solder which is applied onto a coating of the iron material in a width corresponding to at least three times the thickness of said iron material.

2. A girder according to claim 1, wherein the longitudinal section made of the iron material is provided at least on one side with a bevel in the butt-joint region.

3. A method for producing a girder for a vehicle chassis, wherein at least two sheet metal profiles made of cold-formed plane blanks are joined into a circumferentially enclosed hollow profile comprising two longitudinal sections which are materially joined by a joining seam, the sheet metal profiles made of two sections corresponding to the longitudinal sections of the hollow profile consist on the one hand of an iron material and on the other hand of an aluminum material, the blanks of the sections are joined to each other by a welded/soldered joint in the form of a butt-joint by applying a molten aluminum-based material on both sides of the blank made of the iron material to provide a coating on the iron material blank in a width corresponding to at least three times the thickness of said blank before the joined blanks are cold-formed into the sheet metal profiles.

4. A method according to claim 3, wherein the joining seam formed by the additional material between the blanks of the sheet metal profile sections is flattened before the joint cold forming of the joined blanks.

* * * * *